UNITED STATES PATENT OFFICE.

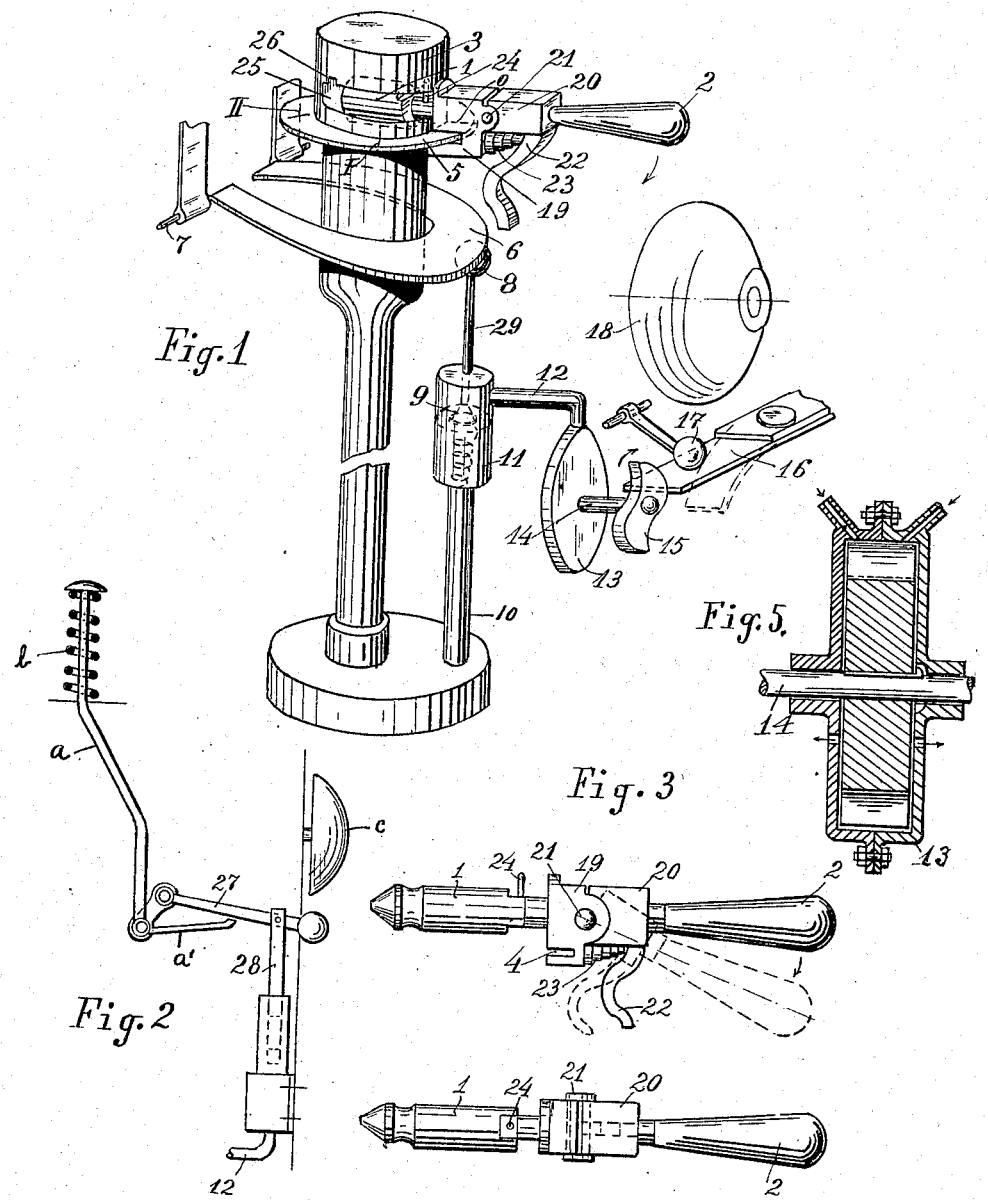
Z. WESSEL.
SIGNALING MEANS.
APPLICATION FILED AUG. 6, 1907.
930,446.
Patented Aug. 10, 1909.

ZOLTÁN WESSEL, OF BUDAPEST, AUSTRIA-HUNGARY, ASSIGNOR OF ONE-HALF TO EDUARD SCHWARCZ, OF BUDAPEST, AUSTRIA-HUNGARY.

SIGNALING MEANS.

No. 930,446.

Specification of Letters Patent.     Patented Aug. 10, 1909.

Application filed August 6, 1907. Serial No. 387,359.

*To all whom it may concern:*

Be it known that I, ZOLTÁN WESSEL, a subject of the King of Hungary, residing at Dohány utca 81, Budapest, Austria-Hungary, have invented new and useful Improvements in Signaling Means, of which the following is a specification.

This invention relates to a signaling device whereby the driver of the vehicle provided with an air brake can give at any time, no matter whether the vehicle is in a state of rest or motion, a constantly ringing bell-siren or any other signal without being compelled, as heretofore, to depress a bell push. The apparatus is operated merely by pressing against the brake handle. It is thus possible for the driver of the vehicle to hold with one hand the starting device and with the other hand the brake handle so that in case of need he can also give warning signals during the braking action.

Experience has shown that many accidents in connection with electric vehicles are caused by the driver—even when observing the stipulated speed—having to ring or give the warning signal with the hand and thus not having time to break the circuit and apply the emergency brake.

Now the object of the present invention is to overcome this drawback by combining the operation of ringing and braking, it being however also possible to ring and brake separately. By this combination of ringing and braking, the warning signal can be given and the emergency brake applied simultaneously at critical moments; furthermore, the energy and the hand of the driver are taken care of and as the warning signal can be given without any difficulty, the vigilance and activity of the driver are increased. It is possible for the driver with the aid of these improved means when ringing and braking to continue ringing until the vehicle has stopped and even subsequently, while hitherto the ringing had to cease as soon as the brake was applied. By the new arrangement, it is possible for the person in front of the vehicle to escape the danger at the last moment, because the ringing is continuous and energetic.

The subject matter of the invention is shown in the accompanying drawing in two forms of construction by way of example.

Figure 1 is a perspective view showing the apparatus in use on an electric vehicle with air brake, a wind wheel being provided that is operated by the air of the brake. Fig. 2 shows a similar arrangement, wherein the air of the brake operates a plunger connected with the bell tongue. Figs. 3 and 4 are side elevation and plan respectively of the brake and signal handle. Fig. 5 is a sectional view through the wind wheel 13.

The attachment 1 of the brake and signal handle 2 is inserted in the brake-head 3 in the usual manner. By a horizontal movement of the handle out of the indicated zero position into the operative brake position I or emergency brake position II the vehicle is stopped in the usual manner. The body of the handle has a slit 4 by means of which, for the purpose of retarding the movement of the vehicle, the handle can slide along the ring 5 provided with the characters O, I and II. By this arrangement, the handle is maintained in its horizontal position and cannot be turned on its axis. There is arranged under the ring 5 and parallel thereto a horse-shoe shaped plate 6 which surrounds the brake-head and is adapted to rotate on fixed pins 7. The plate 6 bears—in consequence of its own weight—against the free end 8 of the valve rod 29 of a valve 9 hereinafter described.

The valve 9 is fitted in a casing 11 communicating with the brake air chamber through the medium of the pipe 10. A pipe 12 extends from the interior of the casing above the valve seat to the wind wheel 13 of known construction, see Fig. 5, on the axis 14 of which a cam 15 is mounted which, when rotating, operates a spring plate 16 that causes the clapper 17 to strike the bell 18.

The body of the operating handle consists of two parts 19, 20, of which the part 20 rigidly connected to the handle proper 2 may be turned downwardly about the pin 21. There is provided on the part 20 a downwardly projecting arm 22 against which a spring 23 bears that is attached with the other end to the part 19.

The attachment 1 has on its somewhat narrowed part an upwardly directed stud or pin 24 and consequently the slit 25 is provided above the emergency brake position II with a notch 26 so that the attachment may only be inserted or withdrawn at this part. This is necessary on the one hand, when lifting out the handle which takes place when changing the direction of motion or the like, in order that the vehicle may always be in a state of retardation and on the other hand when inserting the handle that the driver may be convinced whether the emergency brake is working faultlessly or not.

The stud 24 serves for preventing the handle attachment 1 from springing out of the brake-head 3 which is effected by the stud bearing against the inner face of the brake-head casing.

The improved apparatus operates as follows:—When applying the brake, the handle in a horizontal plane is shifted out of its zero position into the operative brake position I or into the emergency brake position, the arm 22 being thus moved over the plate 6 without coming in contact therewith. When ringing, the handle 2 and with it the part 20 will be pressed downward about the pin 21. The arm 22 also depresses the plate and the latter opens the valve 9, so that the compressed air enters the chambers above the valve; the air passes therefrom to the wind wheel 13, thereby causing the cam 15 to rotate on the axis 14; the cam brings the spring plate 16 into the position indicated by dotted lines, so that when the plate is released, the clapper 17 strikes the bell 18. When braking and ringing, the handle on the ring 5 is moved to position I or II and simultaneously depressed, so that the plate 6 releases the valve 9.

The improved apparatus has also the advantage that even in the event of failure of the brakes to act, the bell and the clapper can be used.

In Fig. 2, the arrangement is such that the compressed air coming from the pipe 12 alternatively operates a plunger 28, instead of the wind wheel, which plunger engages with the clapper 27, whereupon the clapper may also be operated independently of the apparatus by hand or foot in the usual manner such as by means of the bell crank lever $a$ controlled by the spring $b$. The short arm $a'$ of the bell crank lever is adapted to engage the clapper 27 and force it against the bell $c$.

Having now particularly described and ascertained the nature of my said invention and in what manner the same is to be performed, I declare that what I claim and wish to secure by Letters Patent is:—

1. In combination with an air brake for motor vehicles, a two part handle on said brake, one part of said handle having oscillating movement in a vertical plane, an arm on said oscillating part, a signaling device operated by compressed air, a valve controlling the supply of compressed air to said device, and means for controlling said valve from the arm on the oscillating part of the handle.

2. In combination with a brake for motor vehicles, a standard, a brake handle having an oscillating movement in a horizontal plane on said standard, a plate 6 surrounding the handle and having oscillating movement in a vertical plane, a signaling device operated by the movement of said plate, the outer end of said handle having oscillating movement in a vertical plane, and an arm on said moving part of the handle for contacting with the oscillating plate.

3. In combination with an air brake for motor vehicles, a two-part handle on said brake, one part of said handle having oscillating movement in a vertical plane, an arm on said oscillating part, a signaling device operated by compressed air, a valve controlling the supply of compressed air to said device, means for controlling said valve from the oscillating arm, and means for operating the signaling device independently of the handle.

4. In combination with an air brake for motor vehicles, a standard, a brake handle having an oscillating movement in a horizontal plane on said standard, a circular plate engaging with said handle for guiding the same, the outer end of said handle having an oscillating movement in a vertical plane, and a signaling device operated by said oscillating part.

In testimony whereof I have signed my name to this specification in the presence of two subscribing witnesses.

ZOLTÁN WESSEL.

Witnesses:
BENJAMIN GRÜNMALT,
CHARLES EDWARD ZALNY.